US009785481B2

(12) United States Patent
Muckle et al.

(10) Patent No.: US 9,785,481 B2
(45) Date of Patent: Oct. 10, 2017

(54) POWER AWARE TASK SCHEDULING ON MULTI-PROCESSOR SYSTEMS

(71) Applicant: Qualcomm Innovation Center, Inc., San Diego, CA (US)

(72) Inventors: Stephen Muckle, San Diego, CA (US); Srivatsa Vaddagiri, Bangalore (IN); Syed Rameez Mustafa, San Diego, CA (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 0 days.

(21) Appl. No.: 14/808,082

(22) Filed: Jul. 24, 2015

(65) Prior Publication Data

US 2016/0026507 A1   Jan. 28, 2016

Related U.S. Application Data

(60) Provisional application No. 62/028,663, filed on Jul. 24, 2014.

(51) Int. Cl.
*G06F 9/46* (2006.01)
*G06F 9/50* (2006.01)
*G06F 1/32* (2006.01)

(52) U.S. Cl.
CPC ............ *G06F 9/5094* (2013.01); *G06F 1/329* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| 7,467,267 | B1 * | 12/2008 | Mayock | G06F 11/1461 707/999.202 |
| 7,898,545 | B1 * | 3/2011 | Alben | G06F 9/5044 345/502 |
| 9,037,888 | B2 * | 5/2015 | Kurihara | G06F 9/5044 713/320 |
| 2002/0124196 | A1 * | 9/2002 | Morrow | G06F 1/3203 713/320 |
| 2004/0215987 | A1 * | 10/2004 | Farkas | G06F 1/3203 713/300 |

(Continued)

OTHER PUBLICATIONS

IEEE, "Performance Analysis of Power-Aware Task Scheduling anlgorithms on multiprocessor Computers with Dyanamic Voltage and Speed"; pubublished Jun. 25, 2008 (IEEE_2008.pdf; pp. 1-14).*

(Continued)

*Primary Examiner* — Hiren Patel
(74) *Attorney, Agent, or Firm* — Neugeboren O'Dowd PC

(57) ABSTRACT

Methods and apparatus for power-based scheduling of tasks among processors are disclosed. A method may include executing processor executable code on one or more of the processors to prompt a plurality of executable tasks for scheduling among the processors. Processor-demand information is obtained about the plurality of executable tasks in addition to capacity information for each of the processors. Processor power information for each of the processors is also obtained, and the plurality of executable tasks are scheduled on the lowest power processors where processor-demands of the tasks are satisfied.

11 Claims, 6 Drawing Sheets

(56) References Cited

U.S. PATENT DOCUMENTS

| | | | | |
|---|---|---|---|---|
| 2007/0061521 A1* | 3/2007 | Kelly | G06F 9/5033 | 711/147 |
| 2007/0106622 A1* | 5/2007 | Boomershine | G06Q 10/06 | 705/400 |
| 2008/0025622 A1* | 1/2008 | Hanamoto | G06T 3/4007 | 382/235 |
| 2008/0172398 A1* | 7/2008 | Borkenhagen | G06F 9/5044 | |
| 2009/0172424 A1* | 7/2009 | Cai | G06F 1/3203 | 713/300 |
| 2009/0222654 A1* | 9/2009 | Hum | G06F 13/24 | 713/100 |
| 2009/0249093 A1* | 10/2009 | Borkenhagen | G06F 1/3203 | 713/320 |
| 2009/0249094 A1* | 10/2009 | Marshall | G06F 1/3203 | 713/320 |
| 2009/0288092 A1* | 11/2009 | Yamaoka | G06F 9/5033 | 718/104 |
| 2010/0146513 A1* | 6/2010 | Song | G06F 1/3203 | 718/104 |
| 2010/0153954 A1* | 6/2010 | Morrow | G06F 1/329 | 718/102 |
| 2010/0262971 A1* | 10/2010 | Yamada | G06F 9/505 | 718/104 |
| 2011/0078696 A1* | 3/2011 | Blackburn | G06F 9/4881 | 718/104 |
| 2011/0088041 A1* | 4/2011 | Alameldeen | G06F 9/505 | 718/105 |
| 2011/0161978 A1* | 6/2011 | Jang | G06F 9/505 | 718/104 |
| 2011/0296212 A1* | 12/2011 | Elnozahy | G06F 1/3203 | 713/320 |
| 2011/0310977 A1* | 12/2011 | Nishihara | G06F 9/4881 | 375/240.24 |
| 2012/0144394 A1* | 6/2012 | Prabhakar | G06F 9/4893 | 718/102 |
| 2012/0278800 A1* | 11/2012 | Nicholas | G06F 9/45558 | 718/1 |
| 2013/0060555 A1* | 3/2013 | Thomson | G06F 1/3203 | 703/21 |
| 2013/0074085 A1* | 3/2013 | Thomson | G06F 1/3203 | 718/102 |
| 2013/0097441 A1* | 4/2013 | Yamauchi | G06F 1/3228 | 713/320 |
| 2013/0139170 A1* | 5/2013 | Prabhakar | G06F 9/4893 | 718/104 |
| 2013/0160023 A1* | 6/2013 | Suzuki | G06F 9/4887 | 718/104 |
| 2013/0191613 A1* | 7/2013 | Takahashi | G06F 15/76 | 712/30 |
| 2013/0205126 A1* | 8/2013 | Kruglick | G06F 1/324 | 713/1 |
| 2013/0227326 A1* | 8/2013 | Gwak | G06F 1/3287 | 713/324 |
| 2014/0108828 A1* | 4/2014 | Breternitz | G06F 1/329 | 713/300 |
| 2014/0196050 A1* | 7/2014 | Yu | G06F 9/5088 | 718/104 |
| 2015/0121105 A1* | 4/2015 | Ahn | G06F 1/3293 | 713/322 |
| 2015/0121387 A1* | 4/2015 | Chang | G06F 9/4881 | 718/103 |
| 2015/0186160 A1* | 7/2015 | Arora | G06F 12/0864 | 713/1 |
| 2015/0205644 A1* | 7/2015 | Ito | G06F 9/52 | 718/103 |
| 2015/0212860 A1* | 7/2015 | Ali | G06F 9/5094 | 718/104 |
| 2015/0301858 A1* | 10/2015 | Chung | G06F 9/4893 | 718/103 |
| 2015/0347184 A1* | 12/2015 | Kim | G06F 9/5088 | 718/104 |
| 2016/0085596 A1* | 3/2016 | Nakagawa | G06F 9/5094 | 718/104 |
| 2016/0162004 A1* | 6/2016 | Ljubuncic | G06F 1/329 | 713/320 |

OTHER PUBLICATIONS

Jejurikar et al. "Energy-Aware Task Scheduling With Task Synchronization for Embedded Real-Time Systems", Jun. 6, 2006; (Jerjurikar_2006.pdf; pp. 1-14).*

Merkel et al., "Balancing Power Consumption in Multiprocessor Systems", Apr. 21, 2006; (Merkel_2006.pdf; pp. 1-12).*

Rasmussen M., "[RFCv2 Patch 00/23] sched: Energy cost model for energy-aware scheduling", lkml.org, Jul. 3, 2014, 3 Pages.

* cited by examiner

POWER AWARE TASK SCHEDULING ON MULTI-PROCESSOR SYSTEMS

CLAIM OF PRIORITY UNDER 35 U.S.C. §119

The present Application for Patent claims priority to Provisional Application No. 62/028,663 entitled "POWER AWARE TASK SCHEDULING ON SMP SYSTEMS" filed Jul. 24, 2014, and assigned to the assignee hereof and hereby expressly incorporated by reference herein.

BACKGROUND

Field

The present disclosed embodiments relate generally to computing devices, and more specifically to scheduling tasks in multi-processor computing devices.

Background

Computing devices including devices such as desktop computers, mainframe computers, smartphones, tablet computers, gaming devices, and laptop computers are now ubiquitous. These communication devices are now capable of running a variety of applications (also referred to as "apps") and many of these devices include multiple processors to process tasks (also referred to as processes) that are associated with apps. In many instances, multiple processors (also referred to herein as CPUs) are integrated as a collection of processor cores within a single functional subsystem.

It is known that a scheduler (e.g., an operating system scheduler) may apportion processing loads across the multiple processors. For example, schedulers may schedule an order in which tasks are executed by the processors (e.g., based upon scheduling class/policy and process priorities); schedulers may select a particular processor for a newly initiated task, and schedulers may balance processes between multiple processors for load balancing purposes (e.g., by migrating a task from one core to another core).

Heterogeneous systems have processors that differ with regard to their performance and power characteristics. Some processors, for example, may offer peak performance better than other processors, but at a cost of consuming more power. These types of processors may be referred to as "high performance" or "performance efficient" processors. Other processors that draw less power, and in some instances offer less peak performance, may be referred to as "power efficient" processors. But typical schedulers are unaware of how power consumption may change by running on power efficient processors. As a consequence, current systems are suboptimal or otherwise unsatisfactory.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

An aspect of the present invention may be characterized as a computing device, which includes N processors, N greater than one, wherein at least two of the N processors differ with respect to a level of power that each of the at least two processors draws. In addition, the computing device includes a power-based scheduler configured to obtain information about processor-demand for each of a plurality of tasks; obtain capacity information for each of the N processors; obtain processor-power information for each of the N processors; and schedule each of the plurality of tasks among the N processors based upon the information about processor-demand, the capacity information, and the processor-power information to reduce overall power consumption of the N processors.

Another aspect may be characterized as a method for scheduling processor executable tasks among N processors of a computing device. The method includes executing processor executable code on one or more of the N processors to prompt scheduling of a plurality of executable tasks among the N processors and obtaining processor-demand information about the plurality of executable tasks. In addition, capacity and processor power information for each of the N processors is obtained, and the plurality of executable tasks are scheduled based upon the information about processor-demand, the capacity information, and the processor-power information to reduce overall power consumption of the N processors.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
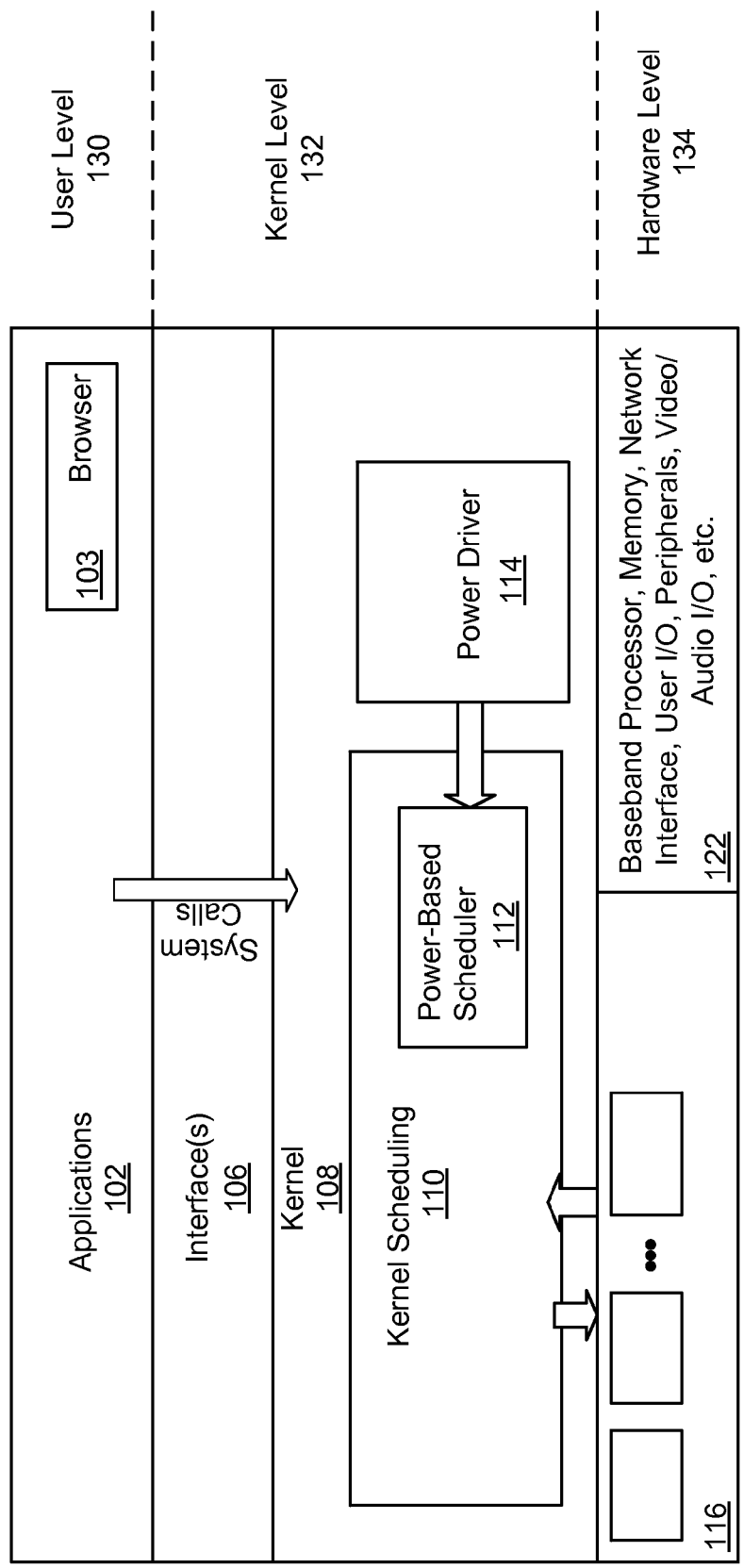
FIG. 1 illustrates a block diagram of a computing device according to several embodiments of the present invention.

Referring to FIG. 1, it is a block diagram illustrating components of a computing system 100 (also referred to herein as a computing device 100). The block diagram includes applications 102 (e.g., a web browser 103) at the highest level of abstraction and hardware such as processors 116 at the lowest level. The kernel 108 along with interface 106 enable interaction between the applications 102 and the hardware level 134. In particular, the interface 106 passes system calls from the applications 102 to the kernel 108. The kernel scheduling component 110 generally operates to schedule tasks among the processors 116. The collection of multiple processors 116 may be closely integrated within an application processor or discrete processors that share the load of processing tasks on the computing device 100. In many examples herein, the processors 116 are described as central processing units (CPUs), but the examples are generally applicable whether the processors 116 are characterized as cores of an application processor, CPUs, or another collection of processors where tasks may be distributed.

The one or more applications 102 may be realized by a variety of applications that operate via, or run on, one or more of the processors 116. For example, the one or more applications 102 may include a web browser 103 and associated plug-ins, entertainment applications (e.g., video games, video players), productivity applications (e.g., word processing, spread sheet, publishing applications, video editing, photo editing applications), core applications (e.g., phone, contacts), and augmented reality applications.

As one of ordinary skill in the art will appreciate, the user-space 130 and kernel-space 132 components depicted in FIG. 1 may be realized by hardware in connection with processor-executable code stored in a non-transitory tangible processor readable medium such as nonvolatile memory, and can be executed by the processors 116. Numerous variations on the embodiments herein disclosed are also possible.

In addition to initially scheduling which processors will execute tasks, the kernel scheduling component 110 (also referred to herein as a scheduling component 110) operates to schedule an order in which tasks are executed, and the scheduling component 110 will also migrate tasks between the processors 116 to balance the load that is being processed. But unlike prior implementations, the exemplary embodiment includes a power-based scheduler 112 to provide power-based scheduling.

There are both static and dynamic factors that affect which CPU is the most power-efficient to run a task. For example, there may be two or more different types of CPUs present. One group of CPUs may offer high performance at high power cost, and the second group of CPUs may offer low to moderate performance at low power cost. Variations across the underlying die of the processors 116 (due to manufacturing variations) may mean one CPU has a different power/performance profile than another. One CPU may be located in a thermally superior place while CPUs in the middle of the die are better able to dissipate heat than CPUs located on the edge of the die. The current temperature and operating frequency of a CPU affects the power required to operate. By enhancing the scheduling component 110 with the power-based scheduler 112 to be aware of the constantly changing power required to operate each CPU, at each of its available frequencies, overall power consu116mption can be reduced.

Figure 2:
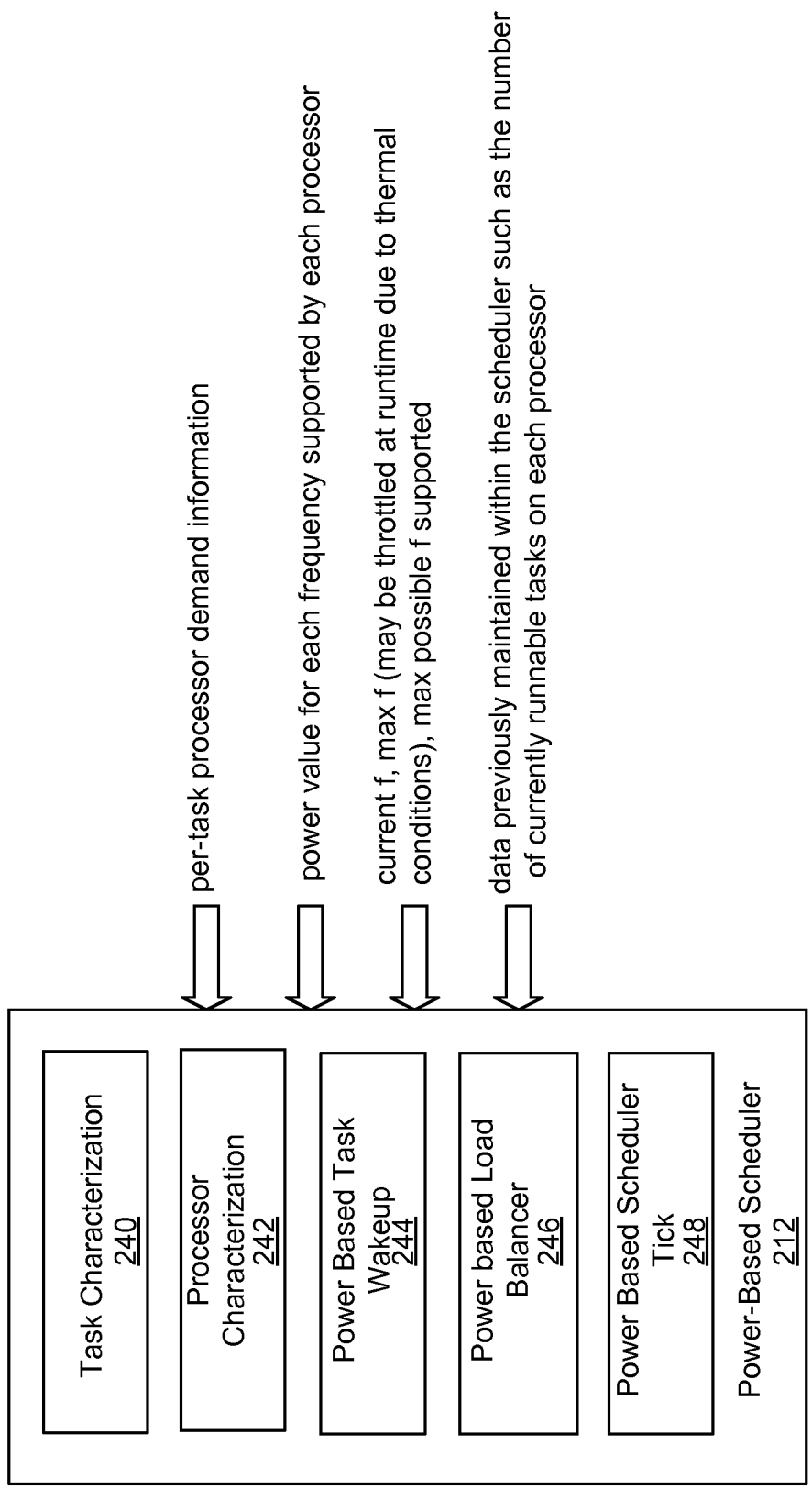
FIG. 2 is a block diagram depicting components of the power-based scheduling module depicted in FIG. 1.

Referring next to FIG. 2, shown is a block diagram representing functional aspects of a power-based scheduler 212 that may be utilized to implement the power-based scheduler 112 shown in FIG. 1. As shown, the power-based scheduler 212 includes a task characterization module 240, a processor characterization module 242, a power-based task wakeup module 244, a power-based load balancer 246, and a power-based scheduler tick 248.

In addition, several inputs to the power-based scheduler 212 are also depicted. As shown, per-task processor demand information is received (e.g., from either a per-entity load tracking (PELT) or a window-based algorithm). A power value for each frequency supported by each processor is also received (e.g., from power driver 114). Another set of inputs to the power-based scheduler 212 includes a current processor frequency, maximum processor frequency (may be throttled at runtime due to thermal conditions), and a maximum possible processor frequency supported by hardware.

In the context of a LINUX kernel, the frequency information (e.g., current frequency, maximum frequency, and maximum possible frequency) comes from an entity called cpufreq. In addition, data previously maintained within the scheduler such as the number of currently runnable tasks on each processor may also be input to the power-based scheduler 212. Combined with tunable parameters, the information that is input to the power-based scheduler 212 can be used by the task characterization module 240 to classify tasks and the processor characterization module 242 to classify processors to aid in the placement of tasks.

Figure 3:
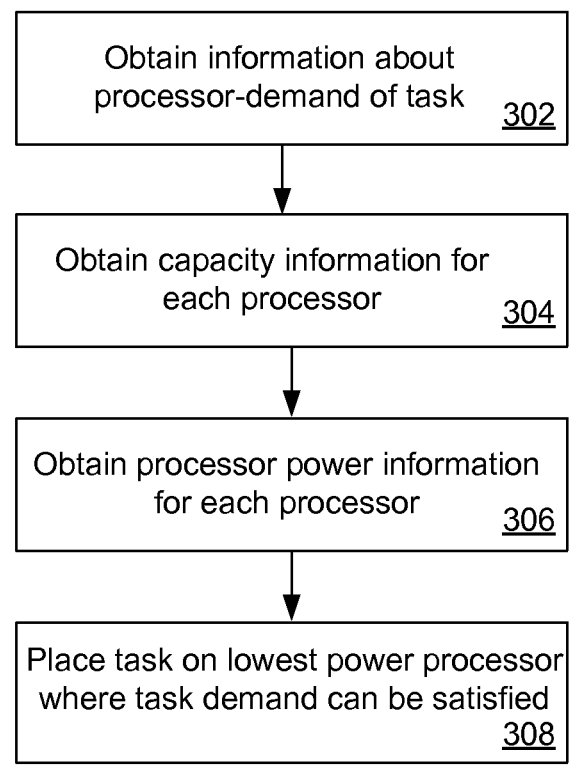
FIG. 3 is a flowchart depicting a method consistent with embodiments disclosed herein.

Referring briefly to FIG. 3, shown is a flowchart generally depicting aspects of methods that may be traversed by the power-based scheduler 112, 212 as described in more detail herein. As depicted, information about the processor-demand of a task is obtained (Block 302), and capacity information for each processor is obtained (Block 304). In addition, processor power information for each processor is obtained (Block 306), and tasks are placed on a lowest-power processor where the task demand can be satisfied (Block 308). The aspects depicted in FIG. 3 are aspects associated different modes of power-based scheduling such as task-wakeup operations, load balancing, tick (interrupt) enhancement, and real time prioritization. Before detailing the different modes of scheduling, information about the inputs available to the power-based scheduler 212 is discussed first.

Referring again to FIG. 2 for example, the per-task processor demand information (also referred to as CPU demand) includes information about the demand exerted by a task, and this information may be used to place the task on one of the processors 116. This information may be provided by a per-entity load tracking (PELT) scheme present in LINUX kernel. Alternatively, a window-based load tracking scheme may be utilized to obtain information about the processor demand exerted by tasks.

The power values for each frequency supported by each processor may be received from the power driver 114, which may provide runtime information on processor power. For example, for each processor the power driver may provide, for each of a plurality of frequencies, a power value. In implementations where the power driver 114 is not available, the scheduler may utilize an alternate value that is indicative of processor power. For example, a max_possible_capacity metric of a CPU may be used as a measure of its power, which will result in larger CPUs being seen as consuming more power.

The depicted task characterization module 240 may characterize a task as a small task or a non-small task. In general, small tasks are tasks that have relatively little processor demand. More specifically, if a task is below a certain percentage of the smallest CPU in the system, it is a "small" task. As a consequence, if a task is a "small task" it is small with respect to every CPU because for a task to be small, it must be below a certain percentage of the smallest CPU in the system. Normally it is desirable to wake a task on an idle CPU to minimize the latency for it to execute, which may mean waking the idle CPU up out of a deep power-saving state. For small tasks, however, this may not be the case. Because a small task is expected to run for very little time, it may be better to put it on a CPU, which is not idle but lightly loaded. The small task threshold may be set by the value sched_small_task. This value is a percentage of the smallest CPU in the system, and if the task consumes this much or less of the minimum CPU in the system, the task is considered "small."

A non-small task is simply a task that is not characterized as small (e.g., the task exceeds the small task threshold, sched_small_task). In some instances (e.g., as discussed below with reference to FIG. 4), a particular non-small task may exert a CPU demand too high for a particular CPU to satisfy, and the scheduler will attempt to find another CPU with more capacity for that particular non-small task. In these instances, the particular non-small task may be characterized as a "big task" relative to that particular CPU because the task demand of that particular non-small task is "too high" for the particular CPU (e.g., the task demand of the particular non-small task matches or exceeds the capacity of that particular CPU).

A non-small task, which runs on a CPU for a long time, for example, might meet these criteria because it would report 100% demand of that CPU. It may be desirable, however, to classify a task, which uses less than 100% of the capability of a particular CPU as a big task so that the task has some "headroom" to grow without its CPU bandwidth getting capped and its performance requirements not being met. This "big task" threshold may therefore be a tunable parameter identified as: sched_upmigrate, which is a tunable in terms of a percentage value. If a demand of a task consumes more than sched_upmigrate percent of the capacity of a particular CPU, that particular CPU will be considered too small for this type of task.

In the present embodiment, the processor characterization module 242 generally operates to provide a characterization of whether a particular one of the processors is "mostly_idle." This classification generally corresponds to a state in which a processor is likely to run with low contention for bandwidth. Although it is possible to simply determine whether the CPU is idle or not, this binary approach may be too conservative because the CPU may be currently executing a very small task and could become idle soon. In addition, it may also be advantageous at times to schedule a task on a mostly_idle CPU (as opposed to a fully idle CPU) because it may be preferable to wait a short time for a small task to complete on a busy CPU as opposed to waiting for that CPU to come out of a low power mode, depending on the system characteristics. Because the scheduler is tracking the demand of each task, it can make an educated guess about whether a CPU will become idle in the near future. Three tunable parameters may be utilized to determine whether a CPU is mostly idle:

sched_mostly_idle_nr_run
sched_mostly_idle_load.

It should be noted that these tunable parameters are per-processor, and if a processor does not have more than sched_mostly_idle_nr_run runnable tasks and is not more than sched_mostly_idle_load percent busy, it is considered mostly idle.

A default value of three may be utilized for sched_mostly_idle_nr_run. If a CPU has this many runnable tasks (or less), it is considered "mostly idle." A mostly idle CPU may be a preferred destination for a waking task depending upon how the scheduler is configured. To be mostly idle a CPU must not have more than sched_mostly_idle_nr_run runnable tasks and must not be more than sched_mostly_idle_load percent busy. A default value of twenty may be used for sched_mostly_idle_load, which is a percentage. If a CPU is busier than this, it cannot be considered "mostly idle." A mostly idle CPU is a preferred destination for a waking task. To be mostly idle a CPU must not have more than sched_mostly_idle_nr_run runnable tasks and must not be more than sched_mostly_idle_load percent busy.

Spill threshold is another characterization of how much task load the scheduler should put on a CPU before considering that CPU busy and putting the load elsewhere. This allows a configurable level of task packing within one or more CPUs in the system. How aggressively should the scheduler attempt to fill CPUs with task demand before utilizing other CPUs? These two tunable parameters together define the spill threshold:

sched_spill_nr_run
sched_spill_load

If placing a task on a CPU would cause it to have more than sched_spill_nr_run runnable tasks, or would cause the CPU to be more than sched_spill_load percent busy, the scheduler will interpret that as causing the CPU to cross its spill threshold. Spill threshold is only considered when having to consider whether a task, which can fit in a power-efficient CPU, should spill over to a high-performance CPU because the aggregate load of power-efficient CPUs exceed their spill threshold.

The sched_spill_nr_run parameter may have a default value of ten, and the intent of this tunable parameter is similar to sched_spill_load, except it applies to nr_running count of a CPU. A non-small task can spill over to a higher-performance CPU when the most power-efficient CPU where it can normally fit has more tasks than sched_spill_nr_run.

The sched_spill_load parameter value has a default value of 100, and CPU selection criteria for fair-sched class tasks is the lowest power CPU where they can fit. When the most power-efficient CPU where a task can fit is overloaded (aggregate demand of tasks currently queued on it exceeds sched_spill_load), a task can be placed on a higher-performance CPU, even though the task strictly doesn't need one. This applies to non-small tasks.

Power band is another processor characterization that may be utilized. The scheduler may be faced with a tradeoff between power and performance when placing a task. For example, if the scheduler sees two CPUs which can accommodate a task:

CPU 1, power cost of 20, load of 10
CPU 2, power cost of 10, load of 15

It is not clear what the right choice of CPU is. The scheduler offers the sched_powerband_limit tunable parameter to determine how this situation should be handled. When the power difference between two CPUs is less than sched_powerband_limit_pct, a load will be prioritized as the deciding factor as to which CPU is selected. If the power difference between two CPUs exceeds that, the lower power CPU is considered to be in a different "band" and it is selected, despite perhaps having a higher current task load.

Figure 4:
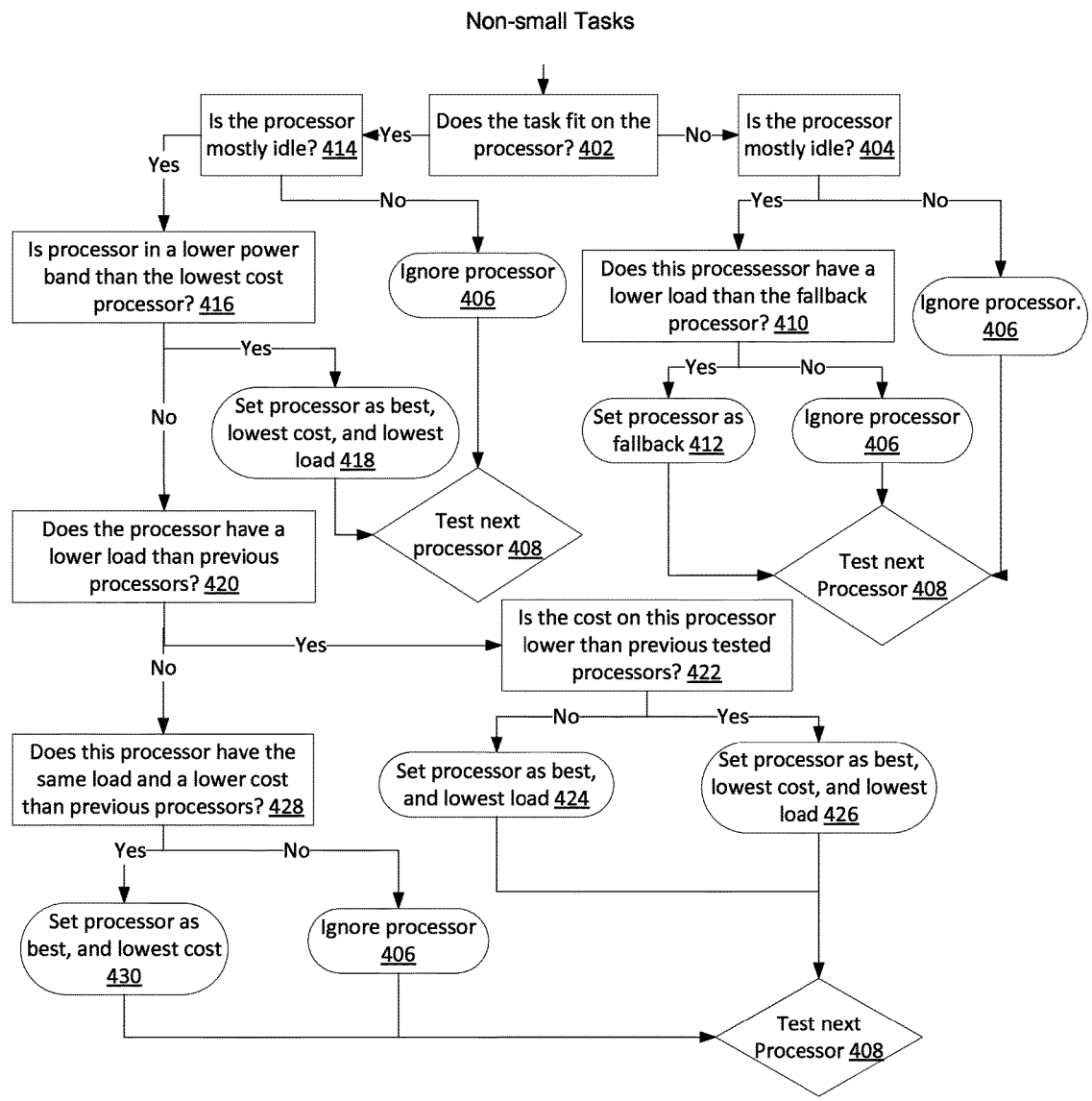
FIG. 4 is a flowchart depicting a method for scheduling a non-small task upon wakeup.
Figure 5:
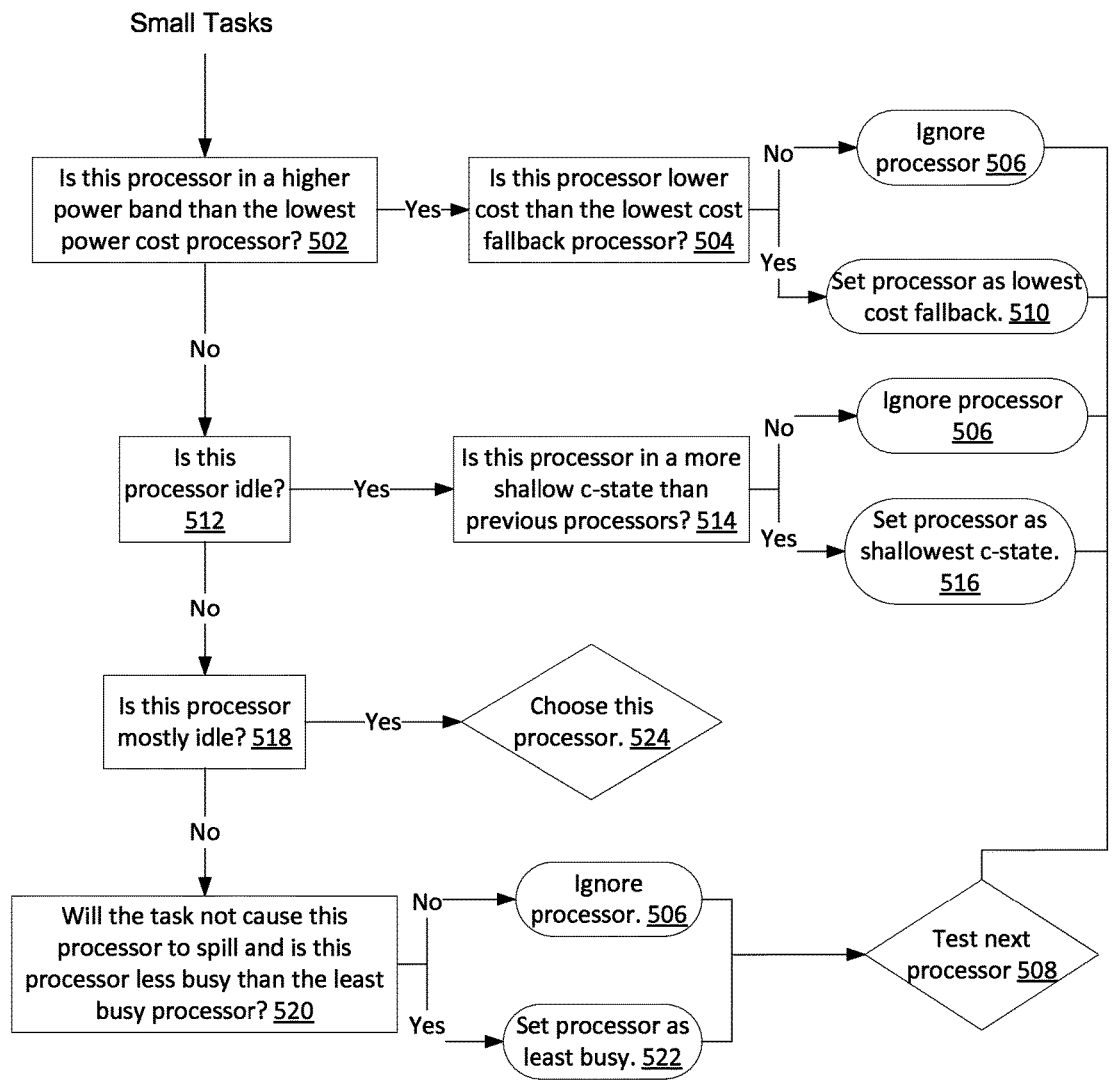
FIG. 5 is a flowchart depicting a method for scheduling a small task upon wakeup.

When tasks wake up, methods depicted in FIGS. 4 and 5 are utilized by the power-based task wakeup module 244 to select the CPU on which to place the task. These methods take into account the power cost of running each CPU at the max of either its current frequency or the frequency estimated to be required to satisfy the task's CPU needs. Initially, a determination is made whether the task is a non-small task or a small task. For non-small tasks the methodology depicted in FIG. 4 is utilized, and for small tasks the methodology depicted in FIG. 5 is used.

Referring to FIG. 4, shown is a method for determining which processor will run a non-small task upon wakeup of the task. As discussed above, the task characterization module 240 may characterize a task as a non-small task or a small task, and the power-based task wakeup module 244 then determines where (among the processors 116) the task is scheduled for execution. In connection with a non-small task, the power based wakeup component tests each available processor individually in a sequence. As shown, a determination is first made as to whether the task fits on the processor (Block 402). As discussed above, a particular non-small task may not "fit" on a particular processor (and may be characterized as a "big task" relative to that particular CPU) because the task demand of that particular non-small task is "too high" for the particular CPU (e.g., the task demand of the particular non-small task matches or exceeds the capacity of that particular CPU). But to allow some "headroom" for the task to grow, a task may be considered a big task that does not fit on a particular processor when the task demand exceeds the tunable sched_upmigrate parameter.

If the task does not fit on the processor (Block 402), then the system tests if this processor would be a viable fallback processor. To do this, the system first tests if the processor is mostly idle (Block 404). If the processor is not mostly idle (Block 404), then the processor is ignored (Block 406), and the next available processor in the sequence is tested (Block 408). If the processor is mostly idle (Block 404), then the processor is tested to determine whether the processor has a lower load than the set fallback processor (Block 410). If the processor does not have a lower load than the set fallback processor (Block 410), then the processor is ignored (Block 406) and the next available processor in the sequence is tested (Block 408). If the processor does have a lower load than the set fallback processor (Block 410), then the processor is selected as the fallback processor (Block 412) and then the next available processor in the sequence is tested (Block 408).

If the task does fit on the processor (Block 402), then the processor is tested to determine whether it would be a viable best, lowest cost, and/or lowest load processor. To do this, the processor is tested to determine whether the processor is mostly idle (Block 414). If the processor is not mostly idle, then the processor is ignored (Block 406), and the next available processor in the sequence is tested (Block 408). If the processor is mostly idle, then the processor is tested to determine whether the processor is in a lower power band than the lowest cost processor (Block 416). If the processor is in a lower power band than the lowest cost processor (Block 416), then the processor is determined to be the best, lowest cost, and lowest load processor (Block 418), and then the next available processor in the sequence is tested (Block 408). If the processor is not in a lower power band than the lowest cost processor (Block 416), then the processor is tested to determine whether the processor has a lower load than the lowest load processor (Block 420).

If the processor does have a lower load than the lowest load processor (Block 420), then if the cost on the processor is lower than the lowest cost processor (Block 422), the processor is set as the best, and lowest load processor (Block 424), and then the next available processor in the sequence is tested (Block 408).

If the processor does not have a lower load than the lowest load processor (Block 420), and if the load on the processor is the same as the lowest load processor and the cost on the processor is lower than the lowest cost processor (Block 428), then the processor is set as the best and lowest cost processor (Block 430). Then the next available processor in the sequence is tested (Block 408). If the load on the processor is not the same as the lowest load processor and/or the cost on the processor is not lower than the lowest cost processor (Block 428), then the processor is ignored (Block 406), and the next available processor in the sequence is tested (Block 408).

This process repeats for every processor that is available to run the non-small task. If a best processor is found, that processor is chosen to run the task. If a best processor is not found, then the fallback processor is chosen. If neither a best processor nor a fallback processor is found, then the last processor that ran the non-small task may be selected.

Referring next to FIG. 5, shown is a flowchart depicting a method, which the power-based task wakeup module 244 may use when selecting a processor for a small task. The method depicted in FIG. 5 is traversed for each processor in a sequence. As shown, initially a determination is made whether the processor is in a high power band than the lowest cost processor (Block 502).

If the processor is in a higher power band than the lowest cost processor (Block 502), and the processor power cost is higher than the lowest cost fallback processor (Block 504), then the processor is ignored (Block 506). Then the next available processor in the sequence is tested (Block 508). If the cost on the processor is lower than the lowest cost fallback processor (Block 504), then the processor is set as the lowest cost fallback processor (Block 510), and the next available processor in the sequence is tested (Block 508).

If the processor is not in a higher power band than the lowest cost processor (Block 502) and the processor is idle (Block 512), then the processor is tested to determine whether the processor is in a shallower c-state than the shallowest c-state processor. A c-state is a low power mode that a processor can go into. A shallower c-state will imply a low power mode, which saves less power but is easier (e.g., faster) to get out of and back to normal operation. If a decision must be made as between two idle processors to place a task on, a processor in a shallower c-state is preferable because the task will start running sooner (with less latency). (Block 514) If the processor is not in a shallower c-state than the shallowest c-state processor (Block 514), then the processor is ignored (Block 506), and the next available processor in the sequence is tested (Block 508). If the processor is in a more shallow c-state than the shallowest c-state processor (Block 514), then the processor is set as the shallowest c-state processor (Block 516), and the next available processor in the sequence is tested (Block 508).

If the processor is not idle (Block 512) and the processor is not mostly idle (Block 518), then a determination is made whether the task will not cause the processor to spill, and it is determined whether the processor is less busy than the least busy processor (Block 520). If the processor will cause the processor to spill and/or is not less busy than the least busy processor (Block 520), then the processor is ignored (Block 506), and the next available processor in the sequence is tested (Block 508). If the task will not cause the processor to spill and the processor is less busy than the least busy processor (Block 520), then the processor is set as the least busy processor (Block 522), and the next available processor in the sequence is tested (Block 508).

If the processor is mostly idle (Block 518), then the system will immediately choose the processor to run the small task. If the system tests all available processors and does not find a mostly idle, lowest power band processor, then the system chooses the shallowest c-state idle processor in the lowest power band. If there is not an idle processor, then the system chooses the least loaded processor in the lowest power band, which would not spill. If there is no processor that will not spill, then the system chooses the lowest cost fallback processor.

Referring again to FIG. 2, the power-based load balancer 246 generally operates to distribute tasks among the processors to achieve better power efficiency without creating substantial load imbalances. When a CPU becomes idle, a typical scheduler would normally see if it can help out other busy CPUs by pulling tasks from them. The power-based load balancer 246 instead prompts the idling CPU to check to see if there is already another more power-efficient CPU, which is already idle, and tasks are moved to that CPU if possible.

Idle CPUs will eventually have their periodic timer tick shut down to save power. The power-based load balancer 246 in an embodiment nominates one CPU to do the load balancing for these idle "tickless" or "NOHZ" CPUs, moving tasks from busy CPUs to them. In prior schedulers, this load balancing normally happens in numerical order of the CPUs. Instead, the power-based load balancer 246 may load balance in order of ascending power consumption. This will result in work going to the most power efficient CPUs when doing NOHZ idle balancing.

In prior schedulers (e.g., prior LINUX schedulers), when attempting to balance tasks between two CPUs, CPUs with one task are normally ignored because that workload cannot be subdivided further. In contrast, the power-based load balancer 246 allows a CPU's lone running task to be moved to a different CPU as long as the destination CPU offers better power efficiency, and no actual load imbalances were seen that the load balancer could solve.

According to an aspect, the power-based load balancer 246 may restrict a flow of tasks from power-efficient CPUs to high-performance CPUs. A spill-over threshold, defined in terms of number of tasks (sched_spill_nr_run) and CPU demand (sched_spill_load), may be provided beyond which tasks can spill over from a power-efficient CPU to high-performance CPU. In addition, the power-based load balancer 246 may allow idle power-efficient CPUs to pick up extra load from over-loaded performance-efficient CPUs and to allow idle high-performance CPUs to pick up non-small tasks from power-efficient CPUs.

According to another aspect, a CPU with lower power rating may be allowed to pick up load from another CPU with higher power rating. Another additional aspect is the allowance for small-task packing. In prior schedulers a CPU with more than one task would kick an idle CPU in tickless state and have it pull a task from it. But that approach is undesirable when, for example, a CPU has couple of small tasks.

The power-based scheduler tick 248 generally operates to enable CPU-bound tasks to be moved to another more power efficient CPU. Although tasks are routed to the best CPUs when they wake up by the power-based task wakeup module 244, a CPU-bound task is not analyzed in connection with the task wakeup methods described with reference to FIGS. 4 and 5; thus a CPU-bound task may execute for a very long time before sleeping and waking up again. To address this issue, the power-based scheduler tick module 248 effectuates a check that is inserted into the scheduler tick path, which executes periodically (e.g., every 10 ms). During this check, if another CPU is found which is idle, more power-efficient, and can accommodate the task, the task is moved to that other CPU.

Consistent with the scheduler tick path, every CPU is interrupted periodically to enable the kernel to update various statistics and possibly preempt the currently running task in favor of a waiting task. There are various optimizations by which a CPU, however, can skip taking these interrupts (ticks). A CPU going idle for considerable time in one such case.

According to an aspect, the power-based scheduler tick module alters the typical processing of tick interrupts that can result in task migration. In case the currently running task on a CPU belongs to fair_sched class, a check is made to determine if it needs to be migrated. Possible reasons for migrating task could be:

a) A task is running on a CPU which is too small for that task (i.e., the task is "big" on that CPU, taking up more than upmigrate %) and there is an available idle CPU with sufficient capacity to properly serve the task; and b) The task is not a small task and a more power-efficient CPU is available to service the task.

In case the test for migration turns out positive (which is expected to be rare event), a candidate CPU is identified for task migration. To avoid multiple task migrations to the same candidate CPU(s), identification of candidate CPUs is serialized via global spinlock (migration_lock).

In the context of the typical LINUX kernel, a "fast-path" CPU selection approach dictates that real time priority tasks normally heavily favor running on the same CPU that they previously ran on, and even when that doesn't occur, the scheduler still tries to find a CPU close to the task's previous CPU in the topology. According to one aspect of the power-based scheduler 212, the task's previous CPU is not considered, and instead, the CPUs running the lowest priority tasks are found, and within that group, the lowest power CPU is selected.

Figure 6:
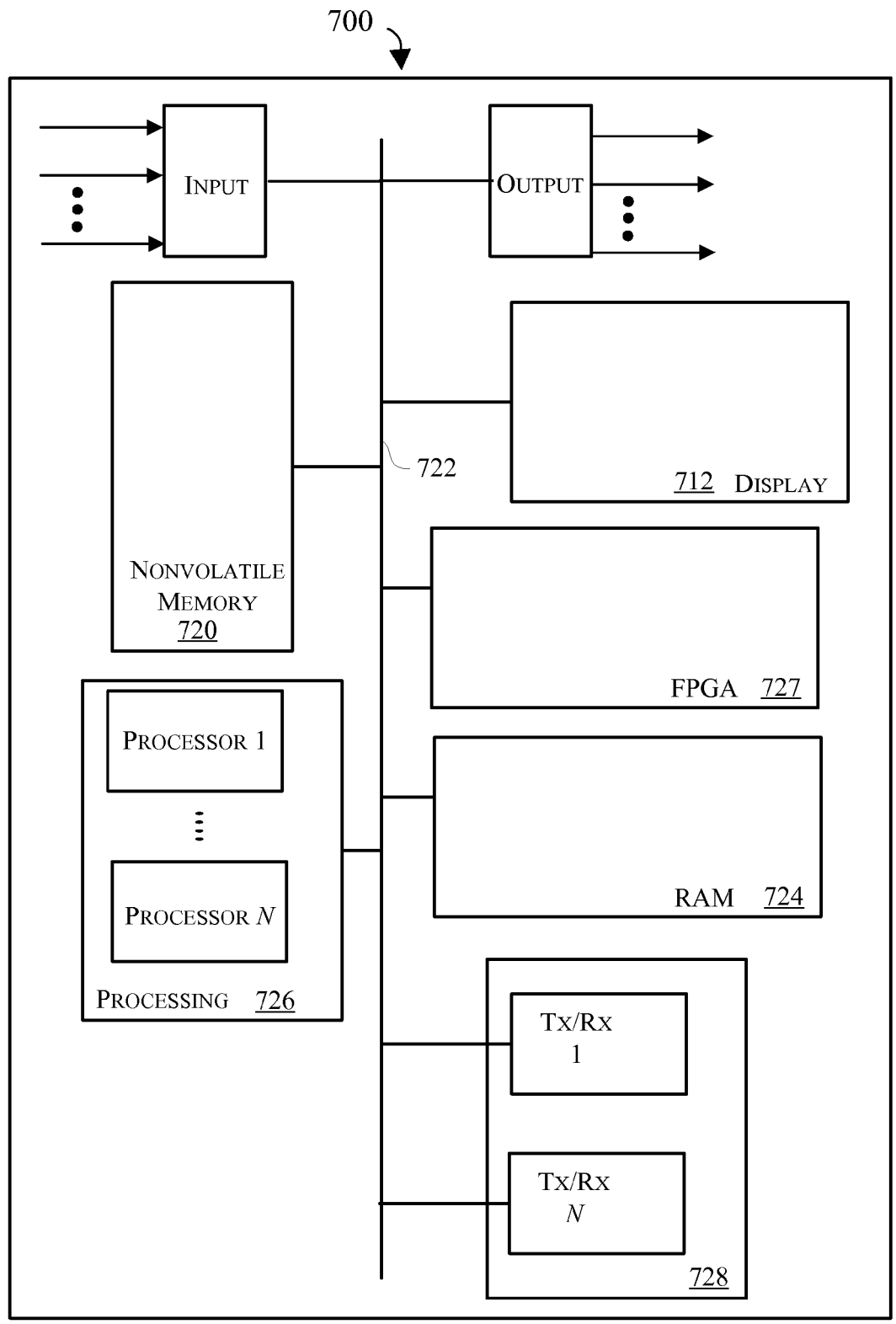
FIG. 6 is a block diagram of an exemplary computing device that may be utilized to realize embodiments disclosed herein.

Referring next to FIG. 6, shown is a block diagram depicting physical components that may be utilized to realize the one or more aspects of the embodiments disclosed herein. As shown, in this embodiment a display portion 712 and nonvolatile memory 720 are coupled to a bus 722 that is also coupled to random access memory ("RAM") 724, a processing portion (which includes N processors) 726, a field programmable gate array (FPGA) 727, and a transceiver component 728 that includes N transceivers. Although the components depicted in FIG. 6 represent physical components, FIG. 6 is not intended to be a detailed hardware diagram; thus many of the components depicted in FIG. 6 may be realized by common constructs or distributed among additional physical components. Moreover, it is contemplated that other existing and yet-to-be developed physical components and architectures may be utilized to implement the functional components described with reference to FIG. 6.

This display portion 712 may be utilized to realize a portion of a display system and it generally operates to provide a user interface for a user. The display may be realized, for example, by an LCD or AMOLED display, and in several implementations, the display is realized by a touchscreen display. In general, the nonvolatile memory 720 is non-transitory memory that functions to store (e.g., persistently store) data and processor executable code (including executable code that is associated with effectuating the methods described herein). In some embodiments for example, the nonvolatile memory 720 includes bootloader code, operating system code, file system code, and non-transitory processor-executable code to facilitate the execution of the methods described herein including the methods described with reference to FIGS. 3-5.

In many implementations, the nonvolatile memory 720 is realized by flash memory (e.g., NAND or ONENAND memory), but it is contemplated that other memory types may be utilized as well. Although it may be possible to execute the code from the nonvolatile memory 720, the executable code in the nonvolatile memory is typically loaded into RAM 724 and executed by one or more of the N processing components in the processing portion 726.

The N processors 726 in connection with RAM 724 generally operate to execute the instructions stored in non-volatile memory 720 to enable the power-based scheduling aspects described herein. For example, non-transitory processor-executable instructions to effectuate the methods described with reference to FIGS. 3-5 may be persistently stored in nonvolatile memory 720 and executed by the N processing components in connection with RAM 724. As one of ordinarily skill in the art will appreciate, in addition to several CPUs, the processors 726 may include a video processor, digital signal processor (DSP), graphics processing unit (GPU), and other processing components.

In addition, or in the alternative, the FPGA 727 may be configured to effectuate one or more aspects of the methodologies described herein (e.g., the methods described with reference to FIGS. 3-5). For example, non-transitory FPGA-configuration-instructions may be persistently stored in nonvolatile memory 720 and accessed by the FPGA 727 (e.g., during boot up) to configure the FPGA 727 to effectuate the functions of the power-based scheduler 212.

The depicted transceiver component 728 includes N transceiver chains, which may be used for communicating with external devices via wireless or wireline networks. Each of the N transceiver chains may represent a transceiver associated with a particular communication scheme (e.g., WiFi, CDMA, Bluetooth, NFC, etc.). The transceiver chains may be utilized, for example, to request and receive webpages and webpage objects that are processed (e.g., parsed and rendered).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computing device, the computing device comprising:
   N processors, N greater than one, wherein at least two of the N processors differ with respect to a level of power that each of the at least two processors draws;
   a power-based scheduler configured to:
      obtain information about processor-demand for each of a plurality of tasks;
      obtain capacity information for each of the N processors;
      obtain processor-power information for each of the N processors; and
      schedule each of the plurality of tasks among the N processors based upon the information about processor-demand, the capacity information, and the processor-power information to reduce overall power consumption of the N processors;
   a task characterization module configured, upon wakeup of a particular task, to characterize the particular task as either a small task or a non-small task;
   a processor characterization module configured to:
      characterize each of a first and a second of the N processors as mostly idle if a number of runnable tasks on each of the first and a second processors does not exceed a threshold number of tasks and each of the first and a second processors is not more than a threshold percent busy; and
      characterize the first and a second processors as being in a same power band if a power difference between the first and a second processors is less than a power-band-limit;
   a power-based task wakeup module configured to:
      schedule the particular task to the first processor that is characterized as mostly idle if the particular task is characterized as a small task even if a power cost of the first processor is greater than a power cost of the second processor if a load on the first processor is less than a load on the second processor and the first and a second processors are in the same power band.

2. The computing device of claim 1, wherein the processor-power information for each of the N processors includes a power value for each of a plurality of frequencies.

3. The computing device of claim 1, wherein the power-based task wakeup module, for non-small tasks, is configured to schedule the particular task to one of the N processors based upon a processor power cost.

4. The computing device of claim 1, wherein the power-based scheduler includes:
   a power-based load balancer configured to distribute tasks among the N processors in a nonrandom fashion based on each processor's power efficiency and load, to improve total power efficiency and reduce total load imbalance among the N processors.

5. The computing device of claim 1, wherein the power-based scheduler includes:
   a power-based scheduler tick configured to check on processor-bound tasks at a periodic interval and redistribute the processor-bound tasks based on processor power efficiency and processor idleness to improve total power efficiency among the N processors over the course of the runtime of tasks.

6. A method for scheduling processor executable tasks among N processors of a computing device, the method comprising:
   executing processor executable code on one or more of the N processors to prompt scheduling of a plurality of executable tasks among the N processors;
   obtaining processor-demand information about the plurality of executable tasks;
   obtaining capacity information for each of the N processors;
   obtaining processor power information for each of the N processors; and
   scheduling each of the plurality of tasks among the N processors based upon the information about processor-demand, the capacity information, and the processor-power information to reduce overall power consumption of the N processors;
   characterizing, upon wakeup, a particular task as either a small task or a non-small task;
   characterizing each of a first and a second of the N processors as mostly idle if a number of runnable tasks on each of the first and a second processors does not exceed a threshold number of tasks and each of the first and a second processors is not more than a threshold percent busy;
   characterizing the first and a second processors as being in a same power band if a power difference between the first and a second processors is less than a power-band-limit; and
   scheduling the particular task to the first processor that is characterized as mostly idle if the particular task is characterized as a small task even if a power cost of the first processor is greater than a power cost of the second processor if a load on the first processor is less than a load on the second processor and the first and the second processors are in the same power band.

7. The method of claim 6, including:
distributing tasks among the N processors in a nonrandom fashion based on each individual processor's power efficiency and load to improve total power efficiency and reduce total load imbalance among the N processors.

8. The method of claim 6, including:
checking on processor-bound tasks at a periodic interval and redistributing the processor-bound tasks based on processor power efficiency and processor idleness to improve total power efficiency among the N processors over a course of the runtime of tasks.

9. A non-transitory, tangible processor readable storage medium, encoded with processor readable instructions to perform a method for operating a plurality of processors on a communication device, the method comprising:
executing processor executable code on one or more of the N processors to prompt scheduling of a plurality of executable tasks among the N processors;
obtaining processor-demand information about the plurality of executable tasks;
obtaining capacity information for each of the N processors;
obtaining processor power information for each of the N processors; and
scheduling each of the plurality of tasks among the N processors based upon the information about processor-demand, the capacity information, and the processor-power information to reduce overall power consumption of the N processors;
characterizing, upon wakeup, a particular task as either a small task or a non-small task;
characterizing each of a first and a second of the N processors as mostly idle if a number of runnable tasks on each of the first and a second processors does not exceed a threshold number of tasks and each of the first and a second processors is not more than a threshold percent busy;
characterizing the first and a second processors as being in a same power band if a power difference between the first and a second processors is less than a power-band-limit; and
scheduling the particular task to the first processor that is characterized as mostly idle if the particular task is characterized as a small task even if a power cost of the first processor is greater than a power cost of the second processor if a load on the first processor is less than a load on the second processor and the first and a second processors are in the same power band.

10. The non-transitory, tangible processor readable storage medium of claim 9, the method including:
distributing tasks among the N processors in a nonrandom fashion based on each individual processor's power efficiency and load to improve total power efficiency and reduce total load imbalance among the N processors.

11. The non-transitory, tangible processor readable storage medium of claim 9, the method including:
checking on processor-bound tasks at a periodic interval and redistributing the processor-bound tasks based on processor power efficiency and processor idleness to improve total power efficiency among the N processors over a course of the runtime of tasks.

* * * * *